United States Patent Office 3,168,502
Patented Feb. 2, 1965

3,168,502
POLYMER COMPOSED OF PHOSPHONIUM SALTS
David R. Sexsmith, Stamford, Conn., and Everett J. Frazza, Yorktown Heights, N.Y., assignors to American Cyanamid Company, New York, N.Y., a corporation of Maine
No Drawing. Filed Mar. 9, 1961, Ser. No. 94,424
6 Claims. (Cl. 260—88.1)

This invention relates to water-soluble copolymers containing quaternary phosphonium salt groups. More particularly, this invention is directed to novel aqueous-soluble copolymeric compositions obtained by reacting a copolymer of ar-substituted haloalkyl styrenes and a styrene or a different substituted styrene monomer with certain tri-substituted phosphines.

The linear chain copolymers of the invention are thermoplastic resinous polymerization products consisting essentially of two classes of monomers. The first class, which is preferably employed in minor amounts, i.e., less than 25% by weight, is a monoethylenically unsaturated monomer containing a $CH_2=C<$ or vinyl group having attached thereto aromatic substituents consisting more specifically of an aromatic ring containing thereon, as an essential part, a halogenated alkyl radical. The monomers of the second class, namely styrene or different substituted styrene monomers, are also monoethylenically unsaturated compounds capable of copolymerizing with those of the first type through a $CH_2=C<$ group but are distinguished from the first type as not containing a halogenated alkyl radical. The invention is particularly concerned with the advantages afforded by subsequent treatment, with a tri-substituted phosphine, of the copolymerization product of these two specific types of monomers, but it will be understood that other copolymerizable compounds, hereinafter described more fully, may also be present in minor amounts up to about 15% of the weight of the copolymer in some cases.

Typical among this first type of monomers are polymerizable compounds represented by the formula

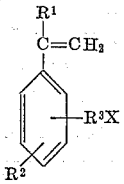

wherein $R^1$ and $R^2$ are substituents selected from the group consisting of hydrogen, halogen, methyl and ethyl radicals, $R^3$ is a substituent selected from the group consisting of methylene and ethylene radicals, and X is a halogen atom. Examples of this type of compound are those such as ar-(chloromethyl)styrene, ar-(1-chloroethyl)styrene, ar-(bromomethyl)styrene, ar-(1 - bromoethyl)styrene, p - chloro - ar-(chloromethyl)styrene, ar-methyl-ar-bromomethylstyrene, ar-ethyl-ar-chloromethylstyrene, ar-methyl-ar-chloromethylstyrene, p-chloro-ar-(1-chloroethyl)styrene, α - methyl-ar(1-chloroethyl)styrene, p-bromo-ar(chloromethyl)styrene, α - methyl-ar(chloromethyl)styrene, and the like.

Examples of the styrene or substituted styrene monomers which are employed in the preparation of copolymers with which the invention is specifically concerned are compounds of the general formula

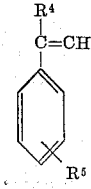

where $R^4$ is a substituent selected from the group consisting of hydrogen and methyl radicals and $R^5$ is a substituent selected from the group consisting of hydrogen, methyl, ethyl, propyl and halogen radicals. Suitable compounds of this type are those such as styrene, methyl styrene, ethyl styrene, propyl styrene, chlorostyrene, bromostyrene, fluorostyrene, iodostyrene, α-methylstyrene, α-methyl methylstyrene, α-methyl ethylstyrene, α-methyl propylstyrene, α-methyl chlorostyrene, α-methyl bromostyrene, α-methyl fluorostyrene, α-methyl iodostyrene and the like.

The relative mole ratio of the copolymerizable components may vary from about 1 to about 25 mole percent of the ar-substituted haloalkyl styrenes and from about 75 to about 99 mole percent of the styrene or substituted styrene monomers and preferably a mole ratio of ar-substituted haloalkyl styrene to styrene or substituted styrene monomer in the range of about 1:99 to about 10:90, respectively.

It is understood that within the scope of the invention, mixtures or blends of the monomers of the first type may be copolymerized with mixtures or blends of monomers of the second type.

As stated, it may be desirable to modify these copolymers by the addition of up to about 15% of a third and different polymerizable monomer during the copolymerization reaction. Suitable compounds are the polymerizable monomers containing a $CH_2=C<$ group. Exemplary of such monomers are vinyl chloride and vinylidene chloride; the vinyl esters, such as vinyl acetate, ethyl acrylate, ethyl methacrylate, methyl methacrylate, etc., and conjugated diolefins, such as butadiene, isoprene, chloroprene, 2,3-dimethyl butadiene, and the like.

The copolymer is insoluble in water and the formation of the quaternary phosphonium salt effects water solubility. The reaction of the copolymer with the phosphine compound converts the non-ionic nature of the copolymer to a novel product which is cationic and substantive to cellulose. When the resin is so conditioned it is selectively adsorbed or absorbed by the cellulose fibers from a dilute aqueous solution or dispersion thereof, containing these fibers, in amounts much greater than those corresponding to the concentration of resin in the solution or to what would be contained in the water normally left in the sheet after forming.

The copolymerization of the vinyl aromatic compound containing the alkyl halogen radical and the styrene or substituted styrene compound can be effected by any of the procedures known to be suitable for polymerizing vinyl compounds. Thus thermal or ultraviolet light polymerization may be employed. Preferably a small quantity, on the order of 0.1% to 2% on the weight of the monomers, of a suitable polymerization initiator, such as azobisisobutyronitrile, benzoyl peroxide, cumene hydroperoxide, pinane hydroperoxide, and the like, is added, after which the reaction mixture is heated at temperatures of about 50° C. to 150° C. until the copolymerization has been carried to the desired extent. Bulk polymerization procedures may be used in which the reagents are simply heated together in a closed vessel, or the polymerization can be carried out in an organic solvent, such as dioxane, toluene, or other aromatic hydrocarbon solvent known in the art to be suitable for this purpose.

The presence of water-soluble material in the aqueous solution of the salts of the copolymers is not excluded. For example, cooked starch may be employed to further enhance the properties which are imparted by the resin without losing any advantages afforded by the copolymers of the invention.

Suitable tri-substituted phosphines which may be utilized in preparing the phosphonium quaternary salt on the ar-haloalkyl radical on the styrene units in the copolymer are those of the formula

wherein $R^6$, $R^7$ and $R^8$ are substituents selected from the group consisting of alkyl radicals of 1–6 carbon atoms, cyanoethyl radicals, aryl radicals, alk-aryl radicals and aralkyl radicals. Illustrative compounds of this type are such as trimethyphosphine, triethylphosphine, tripropylphosphine, tributylphosphine, tripentylphosphine, diethylmethylphosphine, dibutylethylphosphine, dipropylmethylphosphine, dicyanoethylmethylphosphine, triphenylphosphine, phenyldicyanoethylphosphine, benzyldicyanoethylphosphine, tolyl dicyanoethylphosphine, benzyldiethylphosphine, tolyl diethylphosphine, and the like.

In preparing the quaternary phosphonium salt, the phosphine compound, preferably in excess of an equal molar ratio, based on the amount of ar-haloalkyl substituted styrene, is employed although generally amounts even less than equal molar quantity of the phosphine may be sufficient. In general, quantities of the phosphine compound to ar-haloalkyl substituted styrene in the copolymer in a molar ratio of from about 0.8:1 to about 2.0:1, respectively, may be used. Larger relative quantities of the phosphine may be used but no advantage accrues thereby.

The temperature employed in the quaternizing reaction may vary from about room temperature to reflux. It is preferred that temperatures in the range of from about 40° C. to about 80° C. be employed.

The quaternary phosphonium salt prepared from the copolymer according to the invention may be represented by the general formula

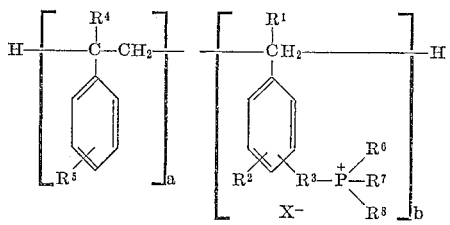

wherein $R^1$ through $R^8$ and X have the values hereinabove defined and the mole ratio of $a$ to $b$ is from about 99:1 to about 75:25, respectively.

From a practical standpoint, the copolymer is dissolved in a water-miscible organic solvent and reacted with the tertiary phosphine. As the reaction proceeds, the hydrophobic copolymer becomes more water-soluble and water may be added to the solution to maintain solubility. In some cases, depending upon the choice of solvent and copolymer, solubility will be maintained without the addition of water. Water-miscible organic solvents for this purpose are such as dioxane, dimethyl formamide, butyl Cellosolve, nitromethane, ethyl Cellosolve, or various water-miscible alcohols, i.e. diglyme and ketones i.e., methyl ethyl ketone.

The molecular weights of the copolymers are not critically important, inasmuch as water-soluble products are obtainable over a wide range of molecular weights. The more useful properties are obtained when the copolymers have attained molecular weights of at least about 10,000 although it will be understood that the resins produced by the above-described processes ordinarily have molecular weights substantially higher than this minimum and usually within the range of about 50,000 to 800,000 and even higher. The molecular weights of the polymers were determined by measurement of the intrinsic viscosity of the polymer backbone, i.e. before reaction thereof with the phosphine, in benzene at 30° C.

It will be seen, therefore, that the linear carbon chain polymers used in practicing the invention are cationic quaternary salts of (a) polymerizable ar-substituted vinyl aromatic, which substituents are halogenated alkyl radicals of 1 to 2 carbon atoms, and (b) styrene or substituted styrene monomers copolymerizable with (a). All or part of the halogens in the vinyl aromatic alkyl group in the straight chain copolymer are converted to salt groups by reacting the copolymers with (c) an organic tri-substituted phosphine of the general formula hereinbefore described.

Because of their water solubility, these resinous phosphonium salts can be economically applied to surfaces. They have been found to confer unusual sizing properties to paper substrates to which they have been applied. In addition to their use with cellulosic bodies, the resins may be applied to various substrates, e.g., to textiles and to glass and metal surfaces, to improve the surface characteristics of, or serve as protective films for, these materials.

In order that the present invention may be more fully understood, the following examples are set forth for purposes of illustration only, and any specific enumeration of details should not be interpreted as a limitation, except as expressed in the appended claims. Parts expressed are parts by weight, unless otherwise stated.

*Example 1*

90 parts of styrene and 10 parts of chloromethyl styrene were placed in a suitable pressure vessel with 0.50 part of benzoyl peroxide. The vessel was sealed and heated at 95° C. for 48 hours. The polymer was removed from the vessel and dissolved in 800 parts of methyl ethyl ketone. The polymer was then purified by precipitation with methanol, yielding 94 parts of a white solid.

Alternatively, in place of dissolving in a solvent, the polymer can be purified by heating for 2 hours under vacuum at 140° C.

*Example 2*

25 parts of styrene and 3.04 parts of chloromethylstyrene were dissolved in 25 parts of benzene. To the solution was added 0.28 part of benzoyl peroxide. The solution was refluxed for 6 hours and then the reaction mixture was poured into 250 parts of methanol. A white gum resulted which was dissolved in methyl ethyl ketone and reprecipitated with methanol resulting in the production of 15 parts of a white polymeric solid.

*Example 3*

The following were placed in a suitable reaction vessel.

|  | Parts |
| --- | --- |
| Styrene | 43.5 |
| Chloromethyl styrene | 5.0 |
| Butyl acrylate | 1.5 |
| Bonzoyl peroxide | 0.25 |

The vessel was sealed and heated to 95° C. for 48 hours. The product was worked up as in Example 1. 48.5 parts of a solid polymeric material was recovered.

*Example 4*

95 parts of styrene and 5 parts of chloromethylstyrene were copolymerized as in Example 1. The polymer was dissolved in 150 parts of dioxane and treated with 3.5 parts of triethylphosphine. The co-reactants are flash-flushed with nitrogen and heated at 60° C. for 6 hours to produce the water-soluble quaternary salt of the copolymer. The produce is composed of recurring units of the formula

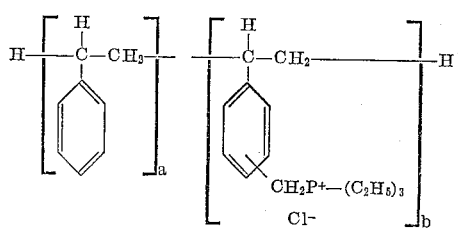

in a ratio of $a$ to $b$ of about 10:1.

Example 5

45 parts of styrene and 8 parts of bromomethyl styrene were copolymerized utilizing the procedure of Example 1. The copolymeric product is then quaternized with 3.5 parts of tributylphosphine. The product is completely water-soluble.

Example 6

90 parts of methyl styrene and 10 parts of chloroethyl styrene were copolymerized according to the procedure of Example 1. The resulting copolymer was then quaternized with 12 parts of diethylmethylphosphine yielding a water-soluble product.

Example 7

A copolymer of styrene and chloromethyl styrene (150 parts), produced as in Example 1, was dissolved in 50 parts of methyl ethyl ketone. To this solution was added 6 parts of phenyl dicyanoethylphosphine. The resulting solution was refluxed for 8 hours. The solution was then diluted with water. The resulting solution had a concentration of only 4.56% solids.

A positive halogen ion test with silver nitrate was obtained with each of the products of Examples 4 to 7.

The cationic products prepared according to the invention may be usefully applied as emulsifiers, detergents, to aid in the separation of ores, to paper, and as corrosion inhibitors in metal plating baths, for example. When applied to paper as a sizing additive, a solution of the quaternary phosphonium product, preferably in a concentration to provide about 1% polymer solids by weight based on the dry weight of the pulp, is used.

The phosphonium salt copolymeric products obtained in Examples 4 to 7 are excellent soil conditioners. When applied to soil for this purpose, i.e., to improve the tilth of the soil, aqueous solutions varying in polymer concentrations of from about 0.2 to about 2.0% polymer by weight of the solution are used to drench the loose soil.

The quaternary phosphonium salts of the invention, used to treat textiles in aqueous solutions, are electrochemically absorbed on the fibers conferring softness to the fabric.

We claim:

1. A water-soluble linear chain cationic resinous composition comprising the quaternary phosphonium salt of a random copolymer of (a) from about 1 to about 25 mole percent of a compound of the general formula

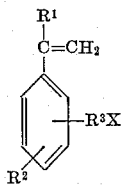

wherein $R^1$ and $R^2$ are substituents selected from the group consisting of hydrogen, halogen, methyl and ethyl radicals, $R^3$ is a substituent selected from the group consisting of methylene and ethylene radicals, and X is a halogen atom, and (b) from about 75 to about 99 mole percent of a compound of the general formula

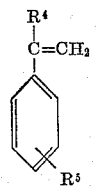

wherein $R^4$ is a substituent selected from the group consisting of hydrogen and methyl radicals and $R^5$ is a substituent selected from the group consisting of hydrogen, methyl, ethyl, propyl and halogen radicals with a phosphine selected from the group consisting of compounds of the formula

wherein $R^6$, $R^7$ and $R^8$ are substituents selected from the group consisting of alkyl radicals of 1–6 carbon atoms, cyanoethyl radicals, aryl radicals, alkaryl radicals and aralkyl radicals, said phosphine being attached to the copolymer on the $R^3$ substituent, said copolymer having a molecular weight of at least about 10,000.

2. A water-soluble linear chain cationic resinous composition comprising the quaternary phosphonium salt of a random copolymer of (a) from about 1 to about 25 mole percent of a compound of the general formula

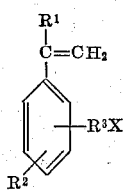

wherein $R^1$ and $R^2$ are substituents selected from the group consisting of hydrogen, halogen, methyl and ethyl radicals, $R_3$ is a substituent selected from the group consisting of methylene and ethylene radicals, and X is a halogen atom, and (b) from about 75 to about 99 mole percent of styrene with a phosphine selected from the group consisting of compounds of the formula

wherein $R^6$, $R^7$ and $R^8$ are substituents selected from the group consisting of alkyl radicals of 1–6 carbon atoms, cyanoethyl radicals, aryl radicals, alkaryl radicals and aralkyl radicals, said phosphine being attached to the copolymer on the $R^3$ substituent, said copolymer having a molecular weight of at least about 10,000.

3. A water-soluble linear chain cationic resinous composition comprising the quaternary phosphonium salt of a random copolymer comprising (a) from about 1 to about 25 mole percent of ar(chloromethyl)styrene and (b) from about 75 to about 99 mole percent of styrene with a phosphine selected from the group consisting of compounds of the formula

wherein $R^6$, $R^7$ and $R^8$ are substituents selected from the group consisting of alkyl radicals of 1–6 carbon atoms, cyanoethyl radicals, aryl radicals, alkaryl radicals and aralkyl radicals, said copolymer having a molecular weight of at least about 10,000.

4. A water-soluble copolymeric composition comprising only randomly recurring units of the formula

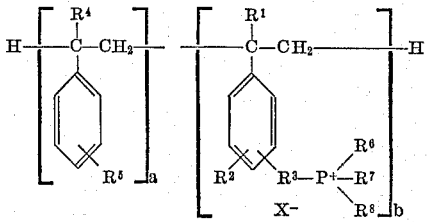

wherein $R^1$ and $R^2$ are substituents selected from the group consisting of hydrogen, halogen, methyl and ethyl radicals, $R^3$ is a substituent selected from the group consisting of methylene and ethylene radicals, $R^4$ is a substituent selected from the group consisting of hydrogen and methyl radicals, $R^5$ is a substituent selected from the group consisting of hydrogen, methyl, ethyl, propyl and halogen radicals, $R^6$, $R^7$ and $R^8$ are substituents selected from the group consisting of alkyl radicals of 1–6 carbon atoms, cyanoethyl radicals, aryl radicals, alkaryl radicals, and aralkyl radicals, and X is a halogen atom, and the mole ratio of $a$ to $b$ is from about 99:1 to about 75:25, respectively, said composition having a molecular weight of at least about 10,000.

5. A water-soluble copolymeric composition comprising only randomly recurring units of the formula

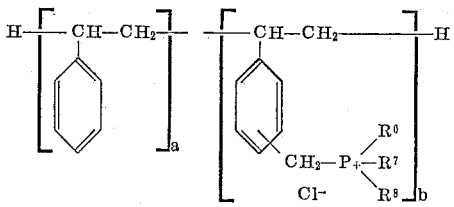

wherein $R^6$, $R^7$ and $R^8$ are substituents selected from the group consisting of alkyl radicals of 1–6 carbon atoms, cyanoethyl radicals, aryl radicals, alkaryl radicals and aralkyl radicals, and the mole ratio of $a$ to $b$ is from about 99:1 to about 75:25, respectively, said composition having a molecular weight of at least about 10,000.

6. A water-soluble copolymeric composition comprising randomly recurring units of the formula

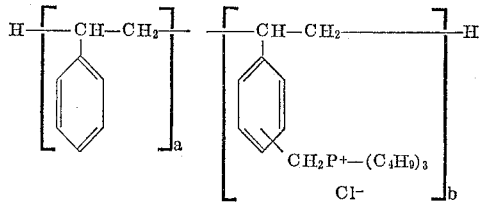

wherein the mole ratio to $a$ to $b$ is from about 99:1 to about 75:25, respectively, said composition having a molecular weight of at least about 10,000.

References Cited in the file of this patent

UNITED STATES PATENTS

| | | |
|---|---|---|
| 2,102,103 | Urbain et al. | Dec. 14, 1937 |
| 2,772,310 | Morris | Nov. 27, 1956 |
| 2,780,604 | Clarke et al. | Feb. 5, 1957 |
| 2,895,925 | Hwa | July 21, 1959 |

UNITED STATES PATENT OFFICE
CERTIFICATE OF CORRECTION

Patent No. 3,168,502 February 2, 1965

David R. Sexsmith et al.

It is hereby certified that error appears in the above numbered patent requiring correction and that the said Letters Patent should read as corrected below.

Column 3, lines 36 to 44, the formula should appear as shown below instead of as in the patent:

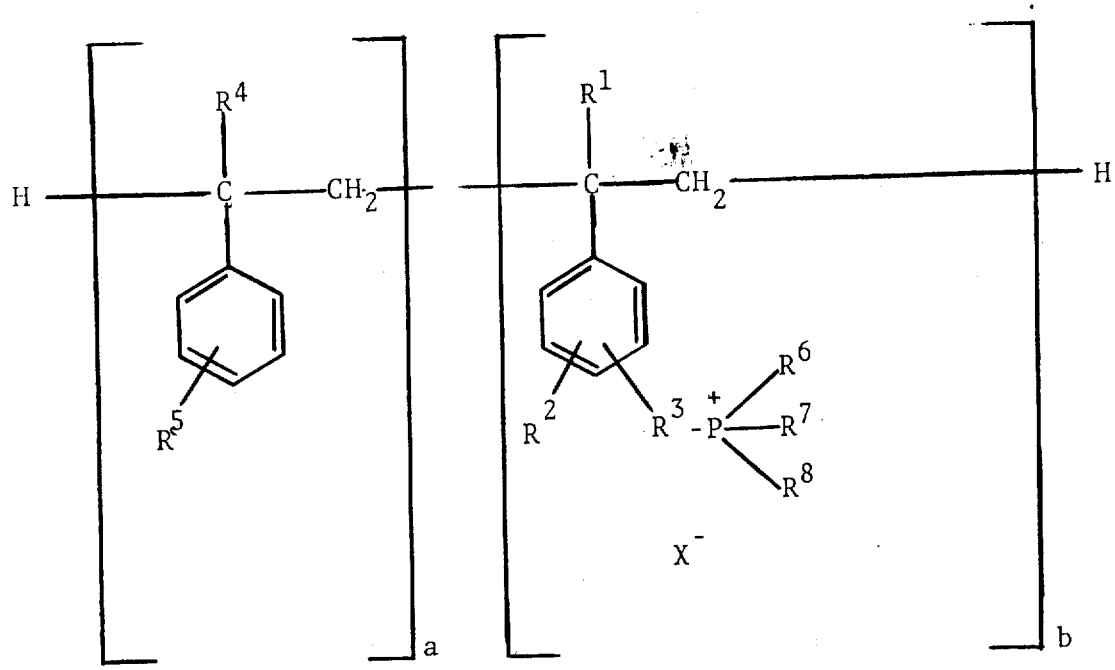

column 4, line 51, for "Bonzoyl peroxide" read -- Benzoyl peroxide --.

Signed and sealed this 28th day of September 1965.

(SEAL)
Attest:

ERNEST W. SWIDER
Attesting Officer

EDWARD J. BRENNER
Commissioner of Patents